United States Patent
Hintz (10) Patent No.: US 7,320,271 B2
(45) Date of Patent: Jan. 22, 2008

(54) SYNTACTIC LANDMINE DETECTOR

(75) Inventor: Kenneth J. Hintz, Fairfax Station, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 324 days.

(21) Appl. No.: 11/247,325

(22) Filed: Oct. 12, 2005

(65) Prior Publication Data

US 2006/0087471 A1    Apr. 27, 2006

Related U.S. Application Data

(60) Provisional application No. 60/617,076, filed on Oct. 12, 2004.

(51) Int. Cl.
*F41H 11/12*    (2006.01)
(52) U.S. Cl. .......................... 89/1.13; 42/402
(58) Field of Classification Search ................. 89/1.13; 42/402

See application file for complete search history.

(56) References Cited

U.S. PATENT DOCUMENTS

| 6,055,214 A * | 4/2000 | Wilk ........................... 367/99 |
| 6,473,025 B2 * | 10/2002 | Stolarczyk et al. ........... 342/22 |
| 6,609,451 B1 * | 8/2003 | Inoue et al. ................. 89/1.13 |

OTHER PUBLICATIONS

Muise et al.; Coastal Mine Detection; SPIE vol. 2765; pp. 15-24; May 1996.*
Muise et al; Coastal Mine Detection; 2 page Abstract; May 1996.*

* cited by examiner

*Primary Examiner*—Stephen M Johnson
(74) *Attorney, Agent, or Firm*—David Grossman (57) ABSTRACT

Disclosed is a Syntactic Landmine Detector. The syntactic landmine detector processes a received signal from a ground penetrating RADAR which contains at least one spatial sequence, the spatial sequence containing relative spatial information locating impedance discontinuities. The spatial sequence is then associated with at least one physical characteristic of a landmine.

20 Claims, 10 Drawing Sheets

Binary sequence describing landmine -
"10001000000001000010000000000000100000000000000100001000000000
10000100000000010000100010000100000001"

SYNTACTIC LANDMINE DETECTOR

CROSS-REFERENCE TO RELATED APPLICATIONS

This application claims the benefit of U.S. Provisional Application No. 60/617,076, filed Oct. 12, 2004, entitled "Syntactic Landmine Detector," which is hereby incorporated by reference in its entirety.

STATEMENT REGARDING FEDERALLY SPONSORED RESEARCH OR DEVELOPMENT

The U.S. government has a paid-up license in this invention and the right in limited circumstances to require the patent owner to license others on reasonable terms as provided for by the terms of contract no. DAAB07-01-D-G601 awarded by the U.S. Army and contract no. DAAB07-98-D-H751 awarded by the U.S. Army.

BACKGROUND OF THE INVENTION

A worldwide humanitarian and military problem is the detection, localization, and subsequent neutralization of buried antipersonnel (AP) and antitank (AT) landmines (hereinafter simply referred to as landmines) as well as unexploded ordnance. The word "detection" is somewhat of a misnomer since it is not the detection of the landmines which is the difficulty but rather the discrimination between landmines and clutter. Clutter is not noise in the sense that is not simply an additive random component which is added to the desired signal. Clutter signals are generated by real targets such as roots, hubcaps, rocks, or other subsurface anomalies which individually are deterministic, but over the entire sample space are randomly distributed. The rejection of clutter is not improved by increases in power or other normal methods of signal to noise ratio (SNR) improvement such as noncoherent addition. Landmine detectors should be able to discriminate landmines from among the various types of clutter. In the case of antipersonnel (AP) mines in particular, their small size and reduced magnetic signatures make their discrimination from clutter particularly difficult. In addition to rocks, roots, and other sizeable detritus, soil anomalies such as hard layers of fragipan have mine-like characteristics which make them difficult to distinguish from landmines. Actual landmine signatures can differ significantly from class prototypes acquired through laborious data collection and processing due to variations in the type and moisture content of the soil in which they are buried, the existence of moisture which has seeped into the landmines themselves, as well as any explosive fill replacement material which has been used in the construction of dummy mines for testing.

Ground penetrating RADARs (GPR) have been used for landmine detection for some 20 years. At least at shallow depths, landmine detection is not a problem and a variety of signal processing techniques can be used to estimate the statistical characteristics of the background and subsequently subtract it from the data to improve detection and discrimination. Imaging ground penetrating RADAR has typically been limited to the extraction of external characteristics of a landmine and its orientation because of limited spatial resolution. What is needed is a landmine detection system capable of imaging the internal structure of non-metallic landmines and the detailed external structure of metallic landmines in order to distinguish them from clutter and, less importantly, from among other landmines.

BRIEF DESCRIPTION OF THE SEVERAL VIEWS OF THE DRAWING(S)

The accompanying drawings, which are incorporated in and form a part of the specification, illustrate an embodiment of the present invention and, together with the description, serve to explain the principles of the invention.

DETAILED DESCRIPTION OF THE INVENTION

Throughout this description, the preferred embodiment and examples shown should be considered as exemplars, rather than as limitations on the present invention. The present invention is a mechanism for locating landmines using signals originating from a Ground Penetrating RADAR (GPR).

The present invention applies syntactic pattern recognition to the problem of landmine detection using a ground penetrating RADAR return signal. Inverse filtering may be applied to a RADAR return signal which results in a series of impulses each of which is associated with a discontinuity in impedance caused by the change in the dielectric constant of the landmine material. These unique sets of locations of impedance discontinuities of different mines enable the use of pattern recognition techniques to differentiate the mines from one another and also to discriminate between mines and clutter. The syntactic pattern recognition approach applies formal languages and automata theory to the modeling, description and recognition of patterns. Finite state machines (FSM) may be designed to compare return GPR signals with known patterns of known landmines.

Figure 1:
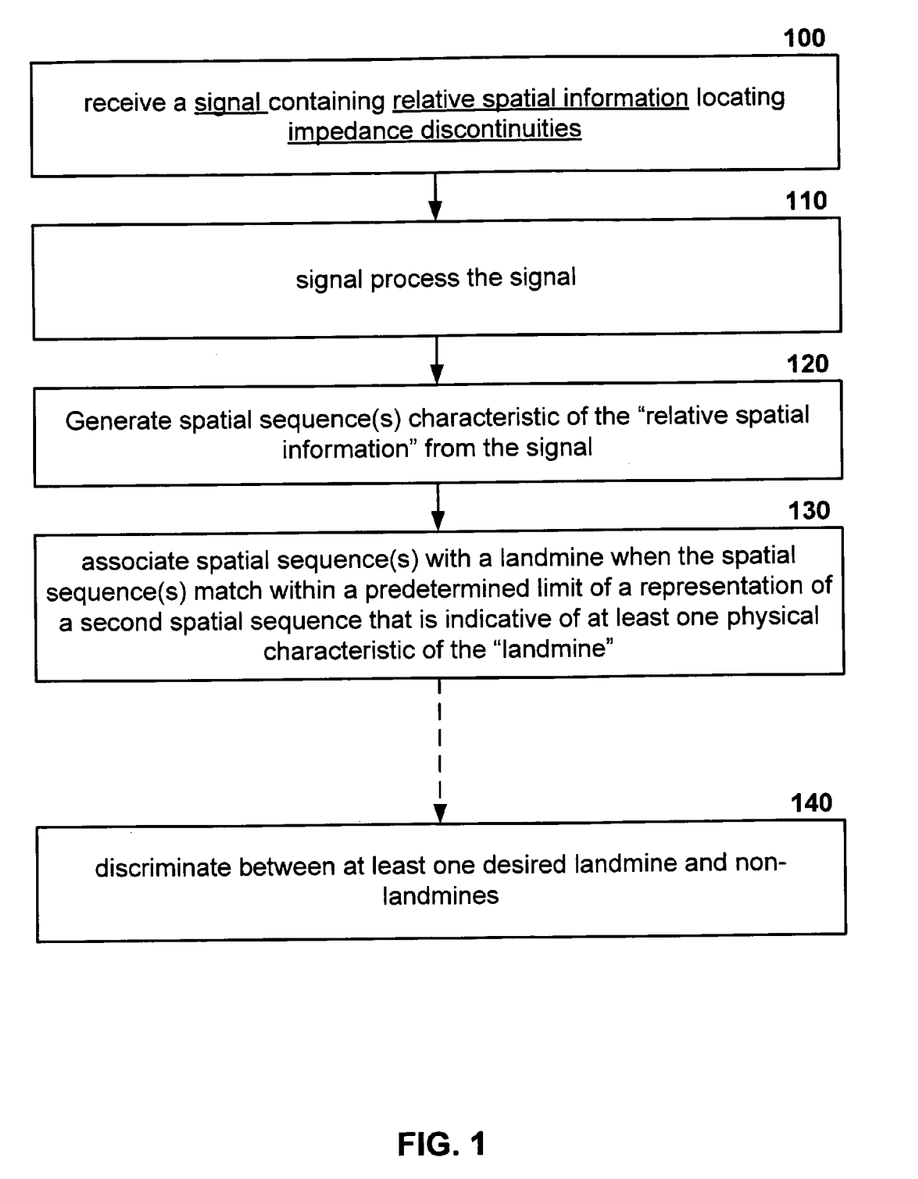
FIG. 1 is a flow diagram of a method for detecting land mines as per an aspect of an embodiment of the present invention.

One embodiment of the present invention is a tangible computer-readable medium encoded with a landmine detection computer program. This "computer program" may be configured to perform a series of steps for detecting a landmine from signals originating from a ground penetrating RADAR when executed by one or more processors. FIG. 1 shows some of these steps. One of the steps includes receiving a received signal from the ground penetrating RADAR that contains relative spatial information which may be used to locate impedance discontinuities step 100. The received signal is processed by a signal processor at step 110. At step 120, the processed signal may be used to generate spatial sequence(s) characteristic of the "relative spatial information". At least one of the spatial sequence(s) may be associated with a landmine at step 130. This association is made when spatial sequence(s) match within a predetermined limit of a representation of a second spatial sequence that is indicative of at least one physical characteristic of the landmine.

A landmine (a mine) is a munition designed to be placed under, on or near the ground or other surface area and to be exploded by the presence, proximity or contact of a person or a vehicle. Many landmines are difficult or impossible to detect using devices such as metal detectors under most field conditions. An example of such a non-metallic landmine is the VS-2.2. The VS-2.2 is a circular, plastic bodied anti-tank (AT) mine which is designed to damage or destroy a vehicle by blast effect. Versions of this mine are manufactured in Italy and Singapore. The mine has two main components; the body which contains the explosive charge and the VS-N pressure plate/fuse. It has small reinforcing ribs running top to bottom around its circumference and it can be found in a variety of colors, it also has a plastic carrying handle mounted on the side. The mine can be laid by hand in any typical soil including wet ground or snow and it will function in temperatures from −31 degrees Centigrade to +70 degrees Centigrade. Most importantly, the VS 2.2 cannot be located using metal detectors under most field conditions and it is highly resistant to blast overpressure from explosive breaching systems.

A RADAR is a device for transmitting electromagnetic signals and receiving reflections of electromagnetic signals from objects of interest (targets) within a volume of coverage. Additional information about a target provided by a RADAR may include one or more of the following: distance (range), description or classification of target by analysis of echoes, and their variation with time. A RADAR operates by transmitting an electromagnetic wave from an antenna. This radiated electromagnetic wave is reflected from changes in dielectric constant in the propagating medium and from metallic objects in the propagating medium. Changes in dielectric constant can be characterized as impedance discontinuities. The locations on metallic objects which reflect electromagnetic energy are called scatterers. The electromagnetic energy which is reflected from impedance discontinuities and/or scatterers is received by a receiving antenna. The receiving antenna converts the incident electromagnetic energy into an electric signal which can then be amplified, filtered, and analyzed. This electric signal is the received signal.

A ground penetrating RADAR is a RADAR configured to image objects that are located underground. One such RADAR is the NIITEK GPR manufactured by NIITEK, Inc. of Sterling, Va. This RADAR is a pulsed, bistatic ground penetrating RADAR designed to gather volumetric and high range resolution imaging data.

Figure 2:
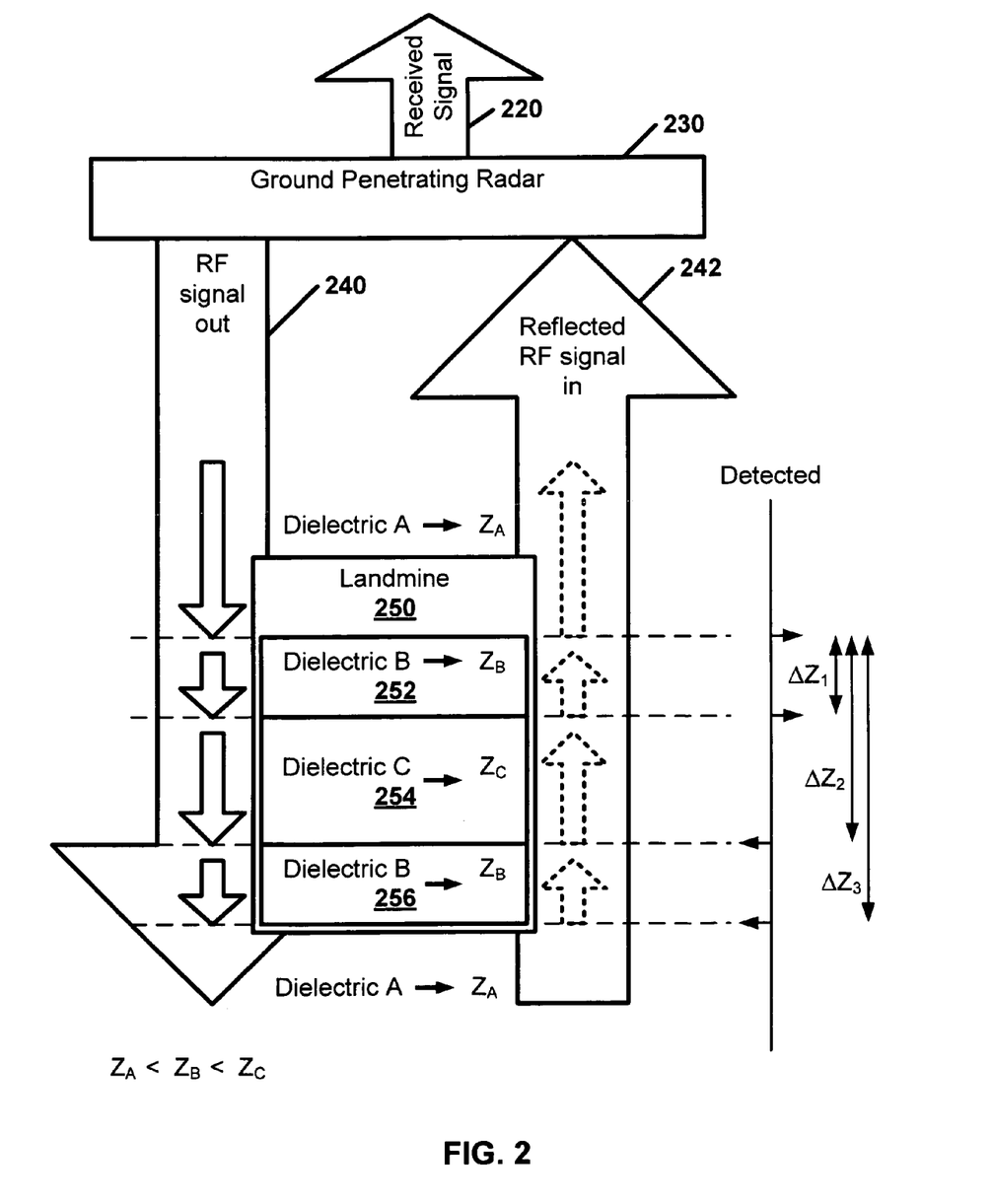
FIG. 2 is a diagram showing how reflections of an RF signal indicate changes in impedance caused by the structure of a landmine as per an aspect of an embodiment of the present invention.

In the present invention as shown in FIG. 2, a ground penetrating RADAR 230 is passed over an area of ground suspected of containing landmine(s) 250 while emitting an RF signal 240. The received signal 220 may then be received from the ground penetrating RADAR 230 by detecting a reflected RF signal 242. This detection may use a detection device which may include a system element or group of elements that responds quantitatively to the measured variable and performs an initial measurement operation. The detecting device preferably performs the initial conversion or control of measurement energy. For the purposes of this disclosure, detection is the determination of the presence of a signal. Detection may also be the process of analyzing an electrical signal in order to determine whether data which is characteristic of the presence of a desired object is present in the signal. In addition, detection can also further mean the localization of characteristic data within a signal. This localization in range provides a measure of distance of the landmine from the antenna. In a simple RADAR, the thresholded amplitude of a signal returned from a landmine or buried object can be used to declare a "detection." This simple method may only detect the presence of something but not discriminate between landmines and non-landmines.

A data processor (including one or more processors) is a device, usually implemented with analog or digital electronics or in software, which "is capable of performing any operation or combination of operations on data or information such as received signal from a ground penetrating RADAR.

There is no requirement for the transmitting and receiving antennas to be physically the same, and in the case of ground penetrating RADARs, the electromagnetic energy is usually radiated from one antenna and received by an adjacent antenna. This is referred to as bistatic RADAR. Bistatic RADAR may be employed for a variety of reasons. In the case of ground penetrating RADARs, bistatic RADARs may be used to allow the transmitted signal to be received in its entirety as a received signal. The normal design of a pulsed monostatic RADAR with a single antenna for transmitting and receiving requires the use of a transmit-receive switch which prevents the large amplitude transmitted power from directly entering and damaging the signal receiver during the time of transmission and for a short time thereafter as determined by the physical characteristics of the transmit-receive switch. The characteristics of a transmit-receive switch can prevent reception of signals physically near to the antenna.

It is also usual (although not absolutely required) for ground penetrating RADARs to operate at baseband. This means that the RADAR transmits a RADAR modulating signal as it is generated rather than using the RADAR modulating signal to modulate a transmitter carrier signal which converts the spectra of the RADAR modulating signal to a higher frequency. The use of base band RADAR for GPR may satisfy a need for large received signal bandwidth in order to realize high accuracy in the ability of the ground penetrating RADAR to measure the absolute range from the transmitting antenna to the impedance discontinuities or scatterers, and hence the relative distances between them. The general name for this type of RADAR is high range resolution RADAR, although what is meant by high range resolution is dependent on the capabilities and use of the RADAR. In general, one can interpret high range resolution RADAR to mean a RADAR which is capable of resolving multiple impedance discontinuities or scatterers as a function of range on a target. For a landmine, a resolution of fractions of an inch may be required to resolve the internal structure of the landmine such as the landmine shown in FIG. 2.

A received signal 220 from a ground penetrating RADAR 230 is typically a bipolar amplitude varying electrical representation of the RADAR cross section or magnitude of the change in dielectric constant at various ranges from the antenna. The RADAR cross section is a measure of the ability of an impedance discontinuity or scatterer to reflect electromagnetic energy with reference to a standard reflector such as a metallic sphere of a specified diameter. Typical units of RADAR cross section are dBsm, i.e., decibels with reference to a square meter. The physical size of the 1 square meter RADAR cross section sphere is frequency dependent but readily calculable.

Referring to FIG. 2, we can see how a return signal containing spatial information is generated. The spatial sequence representing spatial information temporally in the time domain received signal results from the finite travel time of the electromagnetic wave 240 in a propagating medium. When the electromagnetic wave is launched from the antenna, it travels at approximately the speed of light, $C=3\times10^{**}8$ meters/second, or approximately 1 foot/nanosecond. When the electromagnetic wave enters a dielectric, its speed usually changes. Since dielectric discontinuities and scatterers are located at different ranges from the antenna, their reflected energy is returned to the RADAR with a delay in time proportional to twice the distance from the RADAR to the impedance discontinuity or scatterer. That is, time in the electrical signal from the receiver generally is directly proportional to the spatial distribution of the target in range.

With the spatial sequence of a landmine's (250) impedance discontinuities (seen at the interfaces of 252, 254, and 256) or scatterers represented as delays in time in the electrical signal, the electrical signal can be a representation of a physical characteristic of a landmine. This, now temporal or equivalently spatial in range, signal may be unique to a particular type of landmine 250 or be representative of several types of landmines which have similar physical construction. Since the primary purpose of this device is to detect landmines by discriminating them from non-landmines, a library of characteristic sequences of landmines can be developed from measurements or predicted from scale drawings and used to compare with the received signal 242. Since there many range samples on each landmine or non-landmine, there is an extremely small probability that a non-landmine would have exactly the same characteristic signal as a landmine. That is, the detection process consists of discriminating the characteristic sequence of one or more landmines from all the rest of the non-landmine sequences.

Figure 3:
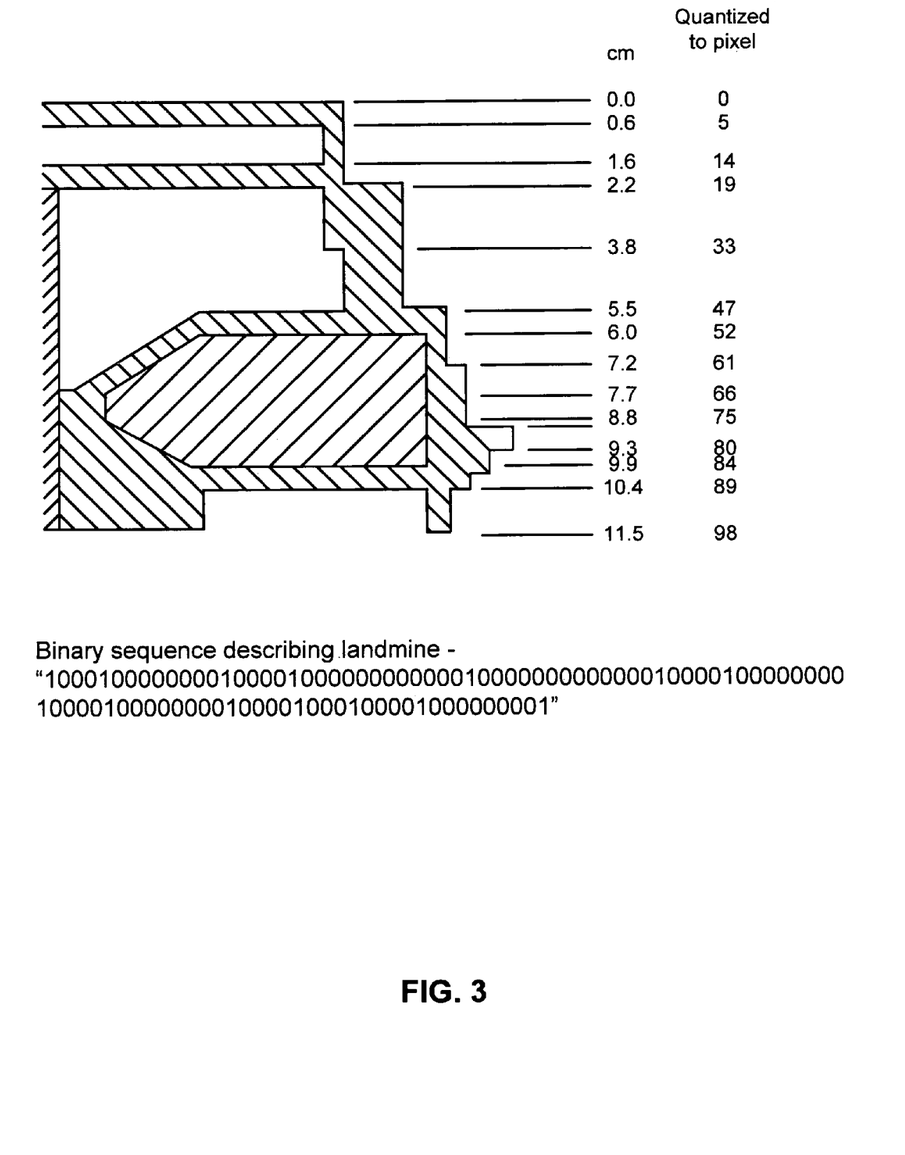
FIG. 3 is a diagram showing locations of impedance discontinuities of an exemplary landmine.

A cross section of an exemplary mine and characteristic sequence information is shown in FIG. 3. Different areas of the mine are made of different materials. Transitions between these areas may create impedance discontinuities. Locations of possible points of impedance discontinuities are shown with their relative position from the top of the mine both in centimeters and quantized pixels. This information may be used to describe the internal structure of the-mine. As described previously, the quantized pixels represent the travel time of a RF signal that travels from a ground penetrating RADAR transmit antenna to a point of impedance discontinuity and then reflected back to a ground penetrating RADAR receive antenna.

It is important to note that the spatial sequence of impedance discontinuity or scatterer locations is a sequence which is relative to the first impedance discontinuity or scatterer of the landmine, usually the top. That is, independent of whether the landmine is on the surface, partially buried, or buried at an unspecified depth, the relative location of the impedance discontinuities or scatterers from the top of the landmine is constant. The relative spacing is furthermore independent of whether the landmine is on the surface, partially buried, or buried since this spacing is dependent on the relative dielectrics of the internal materials of nonmetallic landmines or the external spacing of the scatterers on metallic landmines. These relative locations are relatively insensitive to environment conditions and hence are a repeatable and measurable characteristic of landmines.

Non-reset Finite State Machine

The step of associating at least one of the spatial sequence(s) with physical characteristic(s) of a landmine may be performed using a non-reset finite state machine which is a special case of the more general concept of language recognizers. There is an equivalence relation between regular languages and finite state machines (FSM). That is, a finite state machine (See, e.g., Shields, M. W., An Introduction to Automata Theory. Blackwell Scientific Publications:Oxford, 1987, ISBN 0-632-01553-3 Pbk) can be used to recognize a regular language. A regular language can be comprised of an enumerated list of strings. (See, e.g., D. Kelley, Automata and Formal Languages. Englewood Cliffs, N.J.:Prentice-Hall, 1995, ISBN 0-13-497777-7. LOC QA76.9M35K45). A string may be a concatenated sequence of symbols. Other names for finite state machines which recognize regular languages are the general term "language recognizer" and the more specific "Rabin-Scott machine." An FSM used as a language recognizer is required to start in a specified state and a language is recognized, or accepted, if the machine reaches one of a specified set of final states in response to the sequential application of an input string to the machine.

A non-reset finite state machine is one in which the string to be recognized can be embedded in another string of longer length. An embedded string is one which may have a prefix string, a suffix string, or both. The non-reset language recognizer starts in a specified state and recognizes a string when it reaches one of a set of final states. By non-reset, it is meant that after reaching a final state, the machine may or may not return to the unique starting state depending on whether the recognized string is part of a larger string or not.

A sequence of impedance discontinuities or scatterers can be represented by a sequence of ones and zeroes with the ones representing the location of the impedance discontinuities or scatterers and zeroes where they are not or vice versa. That is, a string is comprised of a concatenation of the symbols one and zero. Each class of mine can have associated with it a string or a set of strings representing the sequence of impedance discontinuities or scatterers (SOIDOS). A set of strings rather than a single string can be used to compensate for uncertainties in the ability of the GPR to exactly locate each impedance discontinuity or scatterer, minor changes in the internal dielectrics themselves due to moisture or other environmental effects, or other changes in location of the SOIDOS due to temperature or other environmental effects.

The importance of using a non-reset finite state machine language recognizer is that a string representing a landmine can be detected while embedded within a larger string which represents the location of SOIDOS in the entire range capability of the ground penetrating RADAR. That is, one does not have to know, a priori, where the top of the landmine is.

A finite state machine or finite state automaton is an abstract machine consisting of a set of states, a set of inputs and a state transition function that maps the present state and input to the next state. The finite state machine is deterministic in the sense that for each state, there is exactly one transition for each possible input and the FSM is never forced to select the next state from among several possibilities. Output is generated at each state from the input string. There are many variants of finite state machines. The FSM designed for this problem is a Moore machine since the outputs are determined by present state alone independent of the present input. A Moore machine M is a machine specified by the sextuple M=(S, I, O, s0, δ, λ) where S is a finite set of states, I is a set of input symbols O is a set of output symbols s0 is the start state δ is a transition function (δ: S×I→S) mapping a state and an input to the next state λ is an output function (λ: S→O) mapping each state to the output alphabet FSM Generator For each string to be recognized, an FSM in the form of a state transition matrix and output matrix may be constructed. A large FSM requires substantial time for manual implementation. Hence in order to generate an FSM to detect each mine pattern, a generalized FSM generator may be designed. In other words, the FSM generator may be used to build a state transition matrix and an output matrix for each string to recognize all the strings that belong to the language of that landmine's pattern. An FSM generator may be specifically designed to solve this particular problem. The operation of the FSM Generator may be dependent on the length of the string and the number of impedance discontinuities. The size of the FSM generated by the FSM generator or the time taken to build the FSM may not be of major importance because the FSM generator is generally an offline tool and the resulting finite state machine transition matrix and output matrix may be used as a language recognizer. The FSM generator may be written in a computer language such as C or C++. Additionally, the FSM generator may be implemented using a technical computing and modeling language such as Matlab available from The MathWorks, Inc. of Natick, Mass.

As mentioned earlier the FSM has a set of final states including the true mine patterns, dithered patterns, noisy patterns and patterns with missing peaks. The output of the final state is a non-zero value and the output of each non-final state is zero. The output value of a final state may be calculated based on the missing impedance discontinuities and noise in the pattern.

Figure 7:
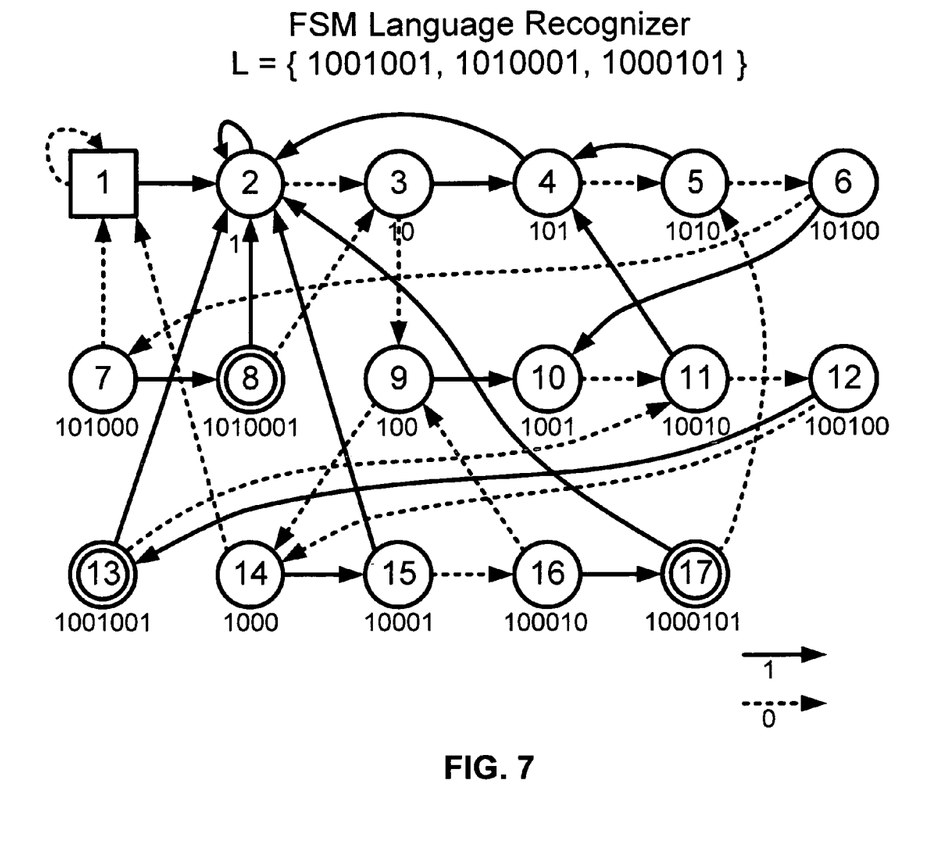
FIG. 7 shows an exemplary finite state machine that could be used by an aspect of an embodiment of the present invention.

A language recognizer transitions one state per bit and this makes it particularly suitable for real-time use. The FSM language recognizer can be extremely fast and its speed of execution is independent of the length of the mine string, number of impedance discontinuities and the size of the finite state machine. FIG. 7 shows the FSM which recognizes an example string of "1000100". First the RADAR return signal is preprocessed using inverse filtering and peak detection and the positions at which there are impedance discontinuities are identified. Now the 3-dimensional data is filled with strings of ones and zeroes, where a 'one' indicates that an impedance discontinuity is identified at that location and a 'zero' otherwise. This data may now be passed through the language recognizer. The language recognizer replaces the strings of ones and zeroes with non-zero values and zeroes. The detection of mine strings is based on columns and hence adjacent columns are also included to improve the performance. Also, effects such as thermal drift can cause adjacent channels to drift. Hence from the output of the language recognizer the results may be summed in a small window and the average value computed. The same process may be repeated for different mines and performed simultaneously.

Multi-correlation Mechanisms

The step of associating at least one spatial sequence with physical characteristic(s) of a landmine may also be performed using a multi-correlation mechanism. A correlator is a device which computes a correlation coefficient (see A. Papoulis, Probability, Random Variables, and Stochastic Processes," p. 210, McGraw-Hill:New York, 1965.) between two signals. In an exemplary embodiment, when the correlation coefficient is equal to 1, the two signals are identical; correlation coefficients less than one indicate a degree of match less than perfect.

Figure 8:
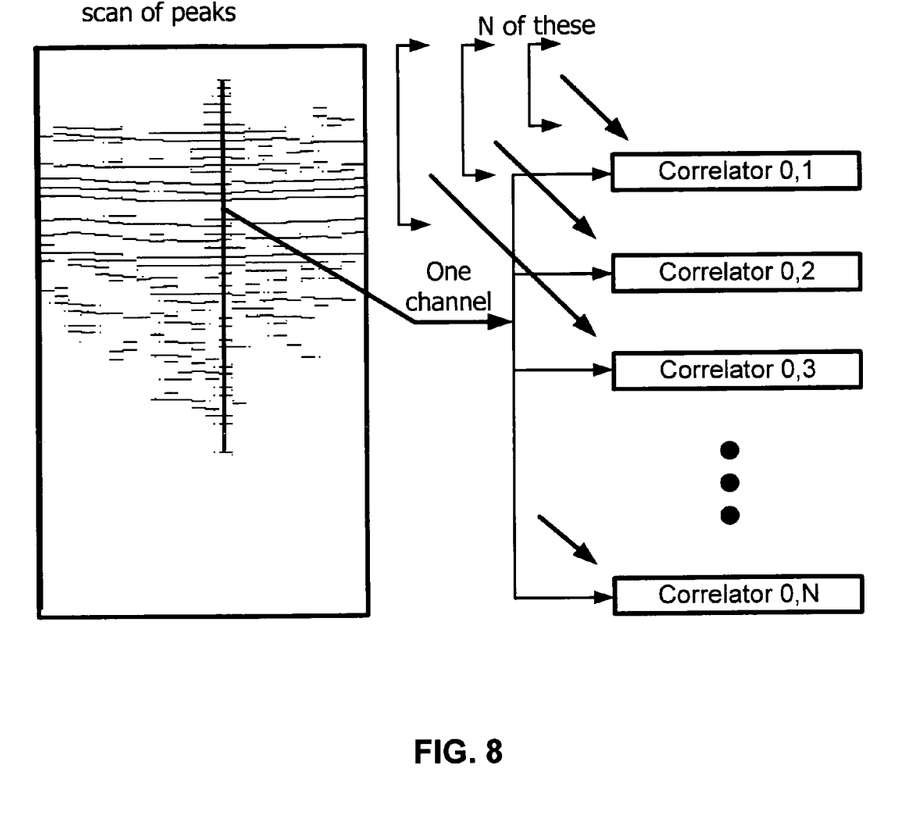
FIG. 8 shows how an exemplary multicorrelator may be applied to a scan of GPR signal peaks as per an aspect of an embodiment of the present invention.
Figure 9:
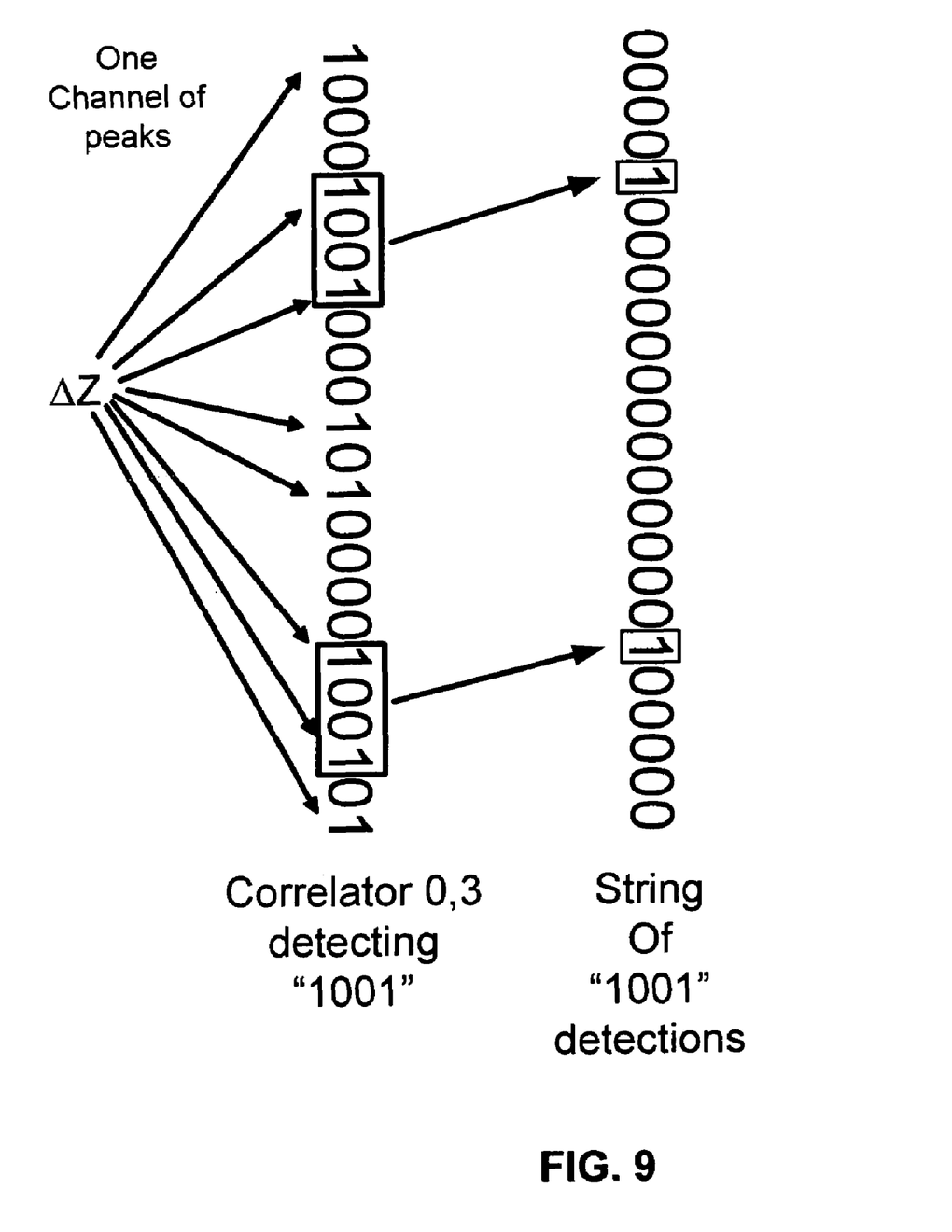
FIG. 9 shows how a correlator makes matches of a target sequence as per an aspect of an embodiment of the present invention.

FIG. 8 shows how a multicorrelator may be applied to mine detection. This figure shows a scan containing peaks from a processed received signal. The correlation coefficient for each range bin may be placed in an output signal in its corresponding temporal or spatial location. FIG. 9 shows how one exemplary correlator detects a particular sequence "1001". The output of this correlator may be a new sequence showing where the detections of "1001" were made. Simultaneously, this same sequence could now be fed into yet another correlator to detect another single sequence such as "10001" and so forth. The outputs of these single sequence correlators may then be logically combined to detect the occurrence of a more complex string representing a landmine.

A multi-correlator computes the correlation coefficients of a multiplicity of different single spacing signals, labeled 1 through n, with a single received signal of impedance discontinuities or scatterers and places the results of these correlations in n different output signals, labeled correspondingly 1 through n, for each different single spacing signal. A single spacing signal is one which represents one of n possible relative spacings between two impedance discontinuities or scatterers in received signal such as a ground penetrating RADAR received signal. The n single spacing correlation output signals may then be combined in such a way that at each location in the received signal, a value, called the figure of merit, is computed which represents the degree of match between the received signal at that location and the spacings which are known to be characteristic of a landmine. Single spacings that match the landmine spacings preferably increment the figure of merit, single spacings that don't match the landmine spacings but are found in the signal preferably decrement the figure of merit. The increment and decrement values are not necessarily the same and heuristics are applied to account for varying degrees of noise or other received signal anomalies. This figure of merit may be computed at each spatial or temporal location.

When the figure of merit exceeds a threshold, a landmine detection may be declared at that spatial or temporal location. Multiple landmine characteristics can be computed in parallel by processing the same n correlations produced by the multiple correlator, but using different landmine spacings as computed by different logical combinations of the multiple correlator outputs which are characteristic of the different types of landmines.

Signal Processing

Received signals may be processed using a signal processor step 110. While many methods are suitable to determine the location of the SOIDOS, some specific signal processing methods may improve the accuracy of finding these locations. There are known systemic errors and anomalies in ground penetrating RADARs such as those due to the large beamwidths of the receiving antennas, dispersive properties of the propagating medium, system nonlinearities, and finite bandwidth of the received signal.

Figure 4:
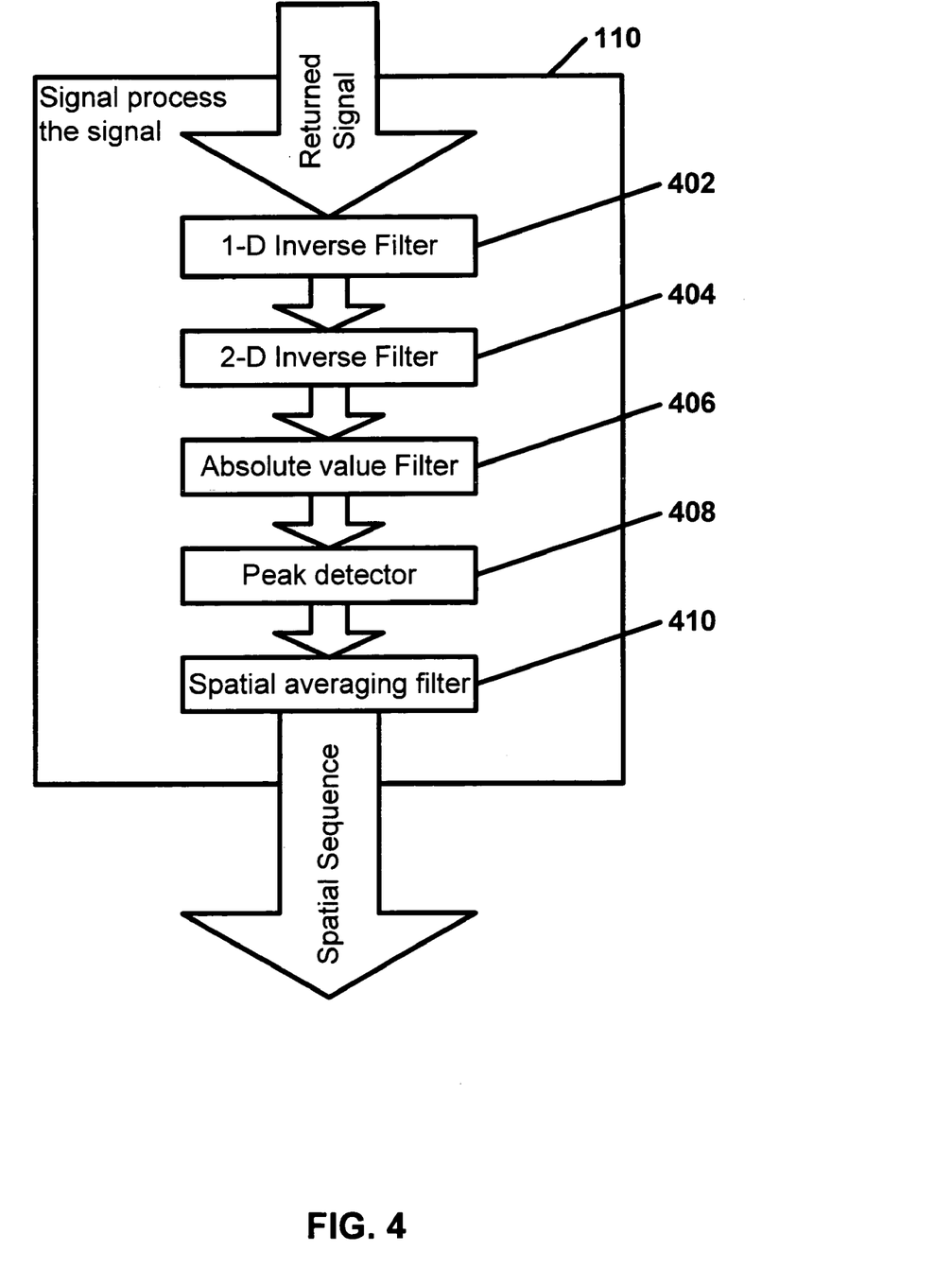
FIG. 4 is a block diagram showing possible filters that may be used to process a returned signal as per an aspect of an embodiment of the present invention.
Figure 5:
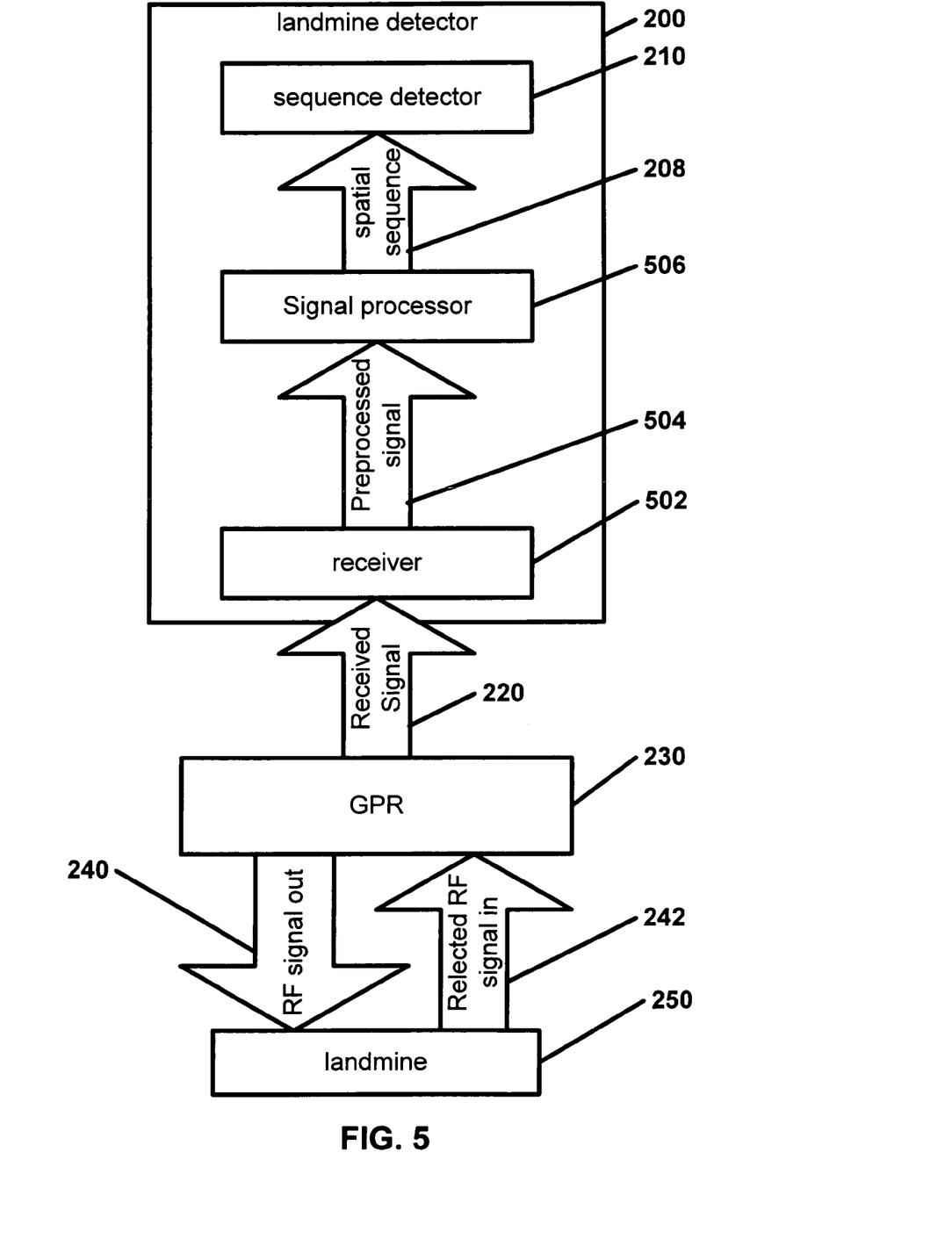
FIG. 5 is a block diagram of a land mine detector as per an aspect of an embodiment of the present invention.
Figure 6:
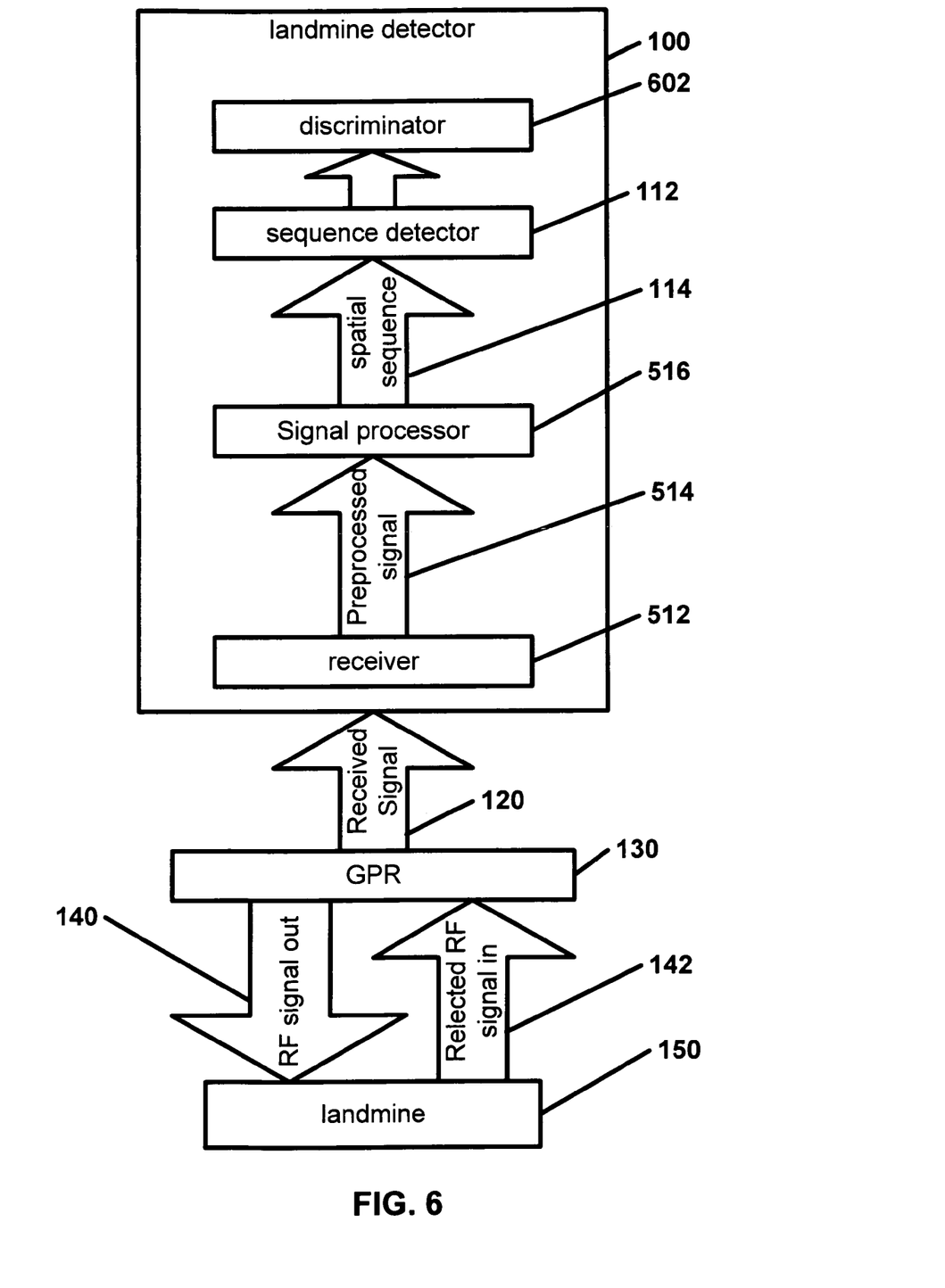
FIG. 6 is a block diagram of a land mine detector including a discriminator as per an aspect of an embodiment of the present invention.

The signal processor may perform at least one of the following: a 1-D inverse filtering step 402; a 2-D inverse filtering step 404; a 3-D inverse filtering step; a spatial averaging filtering step 410; an absolute value filtering step 406; and/or a peak detection filtering step 408.

1-D Inverse Filtering

A 1-D inverse filtering step 402 may help to localize the received signal and minimize effects related to ground bounce. This should improve sequence comparisons to be made without having to remove large ground bounce returns (ground bounce removal is sometimes referred to as haircutting). A typical received signal from a ground penetrating RADAR is a bipolar signal which extends over multiple range bins (spatial or temporal locations). This is due to the limited bandwidth of the signal receiver and the energy storage of the impedance discontinuities since they may not be purely dissipative (resistive). This signal may be of varying amplitude and may be difficult to use to reliably determine where to set a threshold or otherwise determine where the impedance discontinuity or scatterer is precisely located by detecting zero crossings. One method of reducing the impedance discontinuity location uncertainty is to design a matched filter (such as a 1-D convolution kernel developed for the specific antenna and receiver in use) for the received signal. The 1-D convolution kernel-may be developed for a specific antenna based on the return from an air/concrete interface since this approximates a step input to the RADAR receiver. This matched filter preferably converts the received bipolar signal which extends over multiple range bins into a much narrower in range, ideally unipolar signal, the location of whose peak more precisely locates the impedance discontinuity or scatterer. The methodology is known under the term inverse filtering. (See, e.g., E. Robinson & S. Treitel, Geophysical Signal Analysis, p. 130, Society of Exploration Geophysicists:Tulsa, Okla., 2000 (original published by Prentice-Hall, 1969-1973).

Since the received signal is now essentially unipolar, the direction of change in the impedance discontinuity, i.e., from higher to lower or lower to higher dielectric constant, can also be determined. Therefore, one skilled in the art will recognize that 1-D filtering may be used within embodiments of the present invention to increase the accuracy of the locating landmines.

2-D Inverse Filtering

Similarly, 2-D inverse filtering step 404 may be used within the bounds of the present invention to compensate for characteristics of the imaging device by deconvolving the distorting effects of the antenna array. In the case of a GPR, the 2-D filter may reduce the depth and crossrange spreading which results from the wide beamwidth of the adjacent individual antennas of the GPR. The large beamwidth of the individual elements can cause a point source in the field of view to produce data which makes a point look like a parabola. The 2-D inverse filter should return the image to a representation which more closely represents the physical geometry of the buried object. One method of developing a 2-D kernel is to image a solid core sphere such as a golf ball since it is a point scatterer which exhibits uniform RADAR cross section independent of look angle. Again, it may be advantageous to develop a 2-D convolution kernel specifically for the particular GPR antenna and receiver in use.

While a 1-D range signal into the ground may locate the SOIDOS of a landmine, additional accuracy can be obtained by processing multiple adjacent ground penetrating RADAR returns which are notionally placed in a straight line. This can be done by periodic sampling of a single ground penetrating RADAR moving over the ground or by an array of individual GPR antennas. This is usually done by a single GPR sequentially exciting the elements of a linear array of antennas with the received signals from this RADAR array being electrically combined into a 2-D image with depth in one dimension and cross-range in the other. This is called a scan.

When a scan is made, the wide beamwidths and poor sidelobes of the individual transmitting and receiving antennas which form the array admit energy radiated from adjacent antennas producing a signal which has the shape of a hyperbola due to the different lengths of the RADAR signal propagation paths. That is, if a point scatterer is placed in front of the GPR, a hyperbola will likely result in the scan image rather than the desired single point. If linear superposition is assumed, this hyperbola shape can be significantly reduced by performing 2-D inverse filtering, the mathematics of which is identical in principle to the 1-D filtering above. To develop the 2-D inverse filter, a point scatterer may be placed in front of the GPR and its signal recorded and processed to create the inverse filter. This filter may then be applied to a subsequent received real signal to "straighten" it out and make it appear more representative of its true physical shape.

3-D inverse filtering

A 3-D inverse filtering step may also be performed provide some degree of compensation for characteristics of the imaging device. When the GPR antenna array is moved in a directional orthogonal to the plane of the scan, a direction called downrange, a volumetric image is preferably created which can be used to further improved landmine detection performance. Just as with the 2-D array, the large sidelobes and poor beamwidth of the antenna elements in the downrange direction should contribute to detecting reflected GPR energy from in front of and behind the moving antenna array. This should lead to a hyperbolic shape of point scatterers in the downrange direction as well as the crossrange direction. Just as with the 1-D and 2-D methods, an inverse filter can be developed by the same (or similar) method from a downrange signal of a point scatterer which can be applied to a received signal to improve the volumetric resolution of the landmine and improve its image by making it look more like the real landmine which the GPR is sensing.

A spatial averaging filtering step may be used for the purpose of reducing noise. The sequence detector method preferably produces a figure of merit at each instrumented depth in each single GPR return. These figures of merit may be combined to improve performance by summing adjacent values either in crossrange only, downrange only, or both simultaneously. Since a landmine has spatial extent, this improves performance by reducing the effects of noise and yields an improved figure of merit, thereby reducing false alarm rate and improving the probability of detection of a landmine.

An absolute value filtering step may be used to convert the received signal into a uni-polar signal. While improved performance can be had by taking into account the dielectric shift from high to low or low to high, it may be sufficient to determine only the location of the SOIDOS. This can be done by taking the absolute value of the received signal (whether or not it is processed).

Another step that may be used in embodiments of the present invention is a peak detection filtering step. Simple correlation of a received signal with a signal from a known landmine may not be very effective because of the large variation in the amplitude of the received signal due to noise, multibounce, receiver nonlinearities, and propagation anomalies within the dielectric material. It may be sufficient to identify the location of the SOIDOS which can be done by detecting the location of the peaks and producing a binary valued signal with ones representing the location of the peaks, and zeros everywhere else (or vice versa). This conversion from a sampled analog signal to a sampled binary signal significantly reduces the computation associated with determining whether a landmine is present or not. Rather than floating point multiply accumulates, many fewer and simpler binary logic manipulations can then be used.

The step of associating at least one of the spatial sequences with a landmine when the spatial sequence matches within a predetermined limit of a representation of a second spatial sequence that is indicative of landmine characteristics may use a figure of merit. When the figure of merit exceeds a threshold, a landmine detection may be declared. Multiple landmine characteristics may also be computed in parallel by processing the same n correlations produced by the multiple correlator but using different landmine spacings which are characteristic of the different types. Furthermore, it is possible to differentiate among some classes of landmines which have different characteristics. This can be done by placing each landmine in a feature space whose axes are orthogonal, where each of the axes corresponds to the output of a single spacing correlator. Since many classes of landmines have different sequences of spacings, each landmine class can have a prototype which is a point in this n-dimensional feature space. Normal statistical pattern recognition techniques (see, e.g., K. Fukanaga, *Introduction to Statistical Pattern Recognition*, Academic Press:Orlando, LOC 72-75627, 1972) can be used to determine the location of decision boundaries to differentiate among the several classes of targets.

An additional step may be practiced to specifically discriminate between at least one desired landmine and non-landmines (See optional step 140). When the figure of merit exceeds a threshold, a landmine detection is declared. It may not be necessary to differentiate among classes of landmines. In that case, it is sufficient to determine if a SOIDOS of an unknown RADAR signal has a sufficiently high figure of merit to differentiate it from a non-landmine which is usually called clutter. Clutter may include unwanted echoes, typically from the ground, sea, rain or other precipitation, chaff, birds, insects and aurora. Examples of clutter in a GPR signal are rocks, roots, buried animals, frangipan, non-homogeneous soils, and other buried objects which produce measurable ground penetrating RADAR returns but which are not landmines.

If the ground penetrating RADAR is a digital signal or converted to one, then it can be analyzed directly in hardware implemented in VLSI (Very Large Scale Integrated Circuit) chip(s). A common way to do this is to cause the connection of undedicated gates in a field programmable gate array (FPGA) to perform the necessary functions. This programming is typically done with a hardware description language. In this way, a landmine detector may be created which includes: a receiver configured to receive a received signal from a ground penetrating RADAR; and a sequence detector. The received signal may contain spatial sequence(s) containing relative spatial information locating impedance discontinuities. In this case, the sequence detector may be configured to associate at least one of the spatial sequences with physical characteristic(s) of a landmine. Accordingly, the implementation incorporating VLSI components may be designed to perform all or some of the functions described above for primarily software embodiments of the invention.

Target Classifier

The present invention was originally developed under federal sponsorship to solve the problem of detecting landmines. Accordingly, up to this point, this disclosure has been predominantly concerned with describing the present invention with relation to this landmine detection task. However, after the termination of federal support, consideration was independently given to the application of the basic physical principles of the present invention to solve other important target location problems. This enhancement will be referred to here as a target classifier or target detector. As described before for the landmine detector, embodiments of a target classifier may be implemented using a computer program or hardware (possibly including VLSI devices) to process a received signal from an imaging device to classify a target.

The target classifier may include a receiver and a sequence detector. The receiver is preferably configured to receive a received signal from an imaging device. The received signal preferably includes at least one spatial sequence which containing relative spatial information which may be used to locate SOIDOS. The sequence detector is preferably configured to associate at least one of the spatial sequence(s) with at least one physical characteristic of a target.

The imaging device may be a device capable of receiving reflected electromagnetic signals such as a RADAR; a ground penetrating RADAR; a high range resolution RADAR; an optical LIDAR, a synthetic aperture RADAR; a SONAR; an infrared sensor device; an x-ray device; or a backscatter x-ray device. While the technique as described here refers to the processing of patterns in range, there is nothing in the process that precludes its use in any other type of image or representation of data in a measure space. RADAR stands for radio detection and ranging. It generally consists of a transmitter; a transmitting antenna which radiates an electromagnetic signal; a receiving antenna which receives the electromagnetic energy reflected from an impedance discontinuity or conductive scatterer; and radio receiver which converts the received signal into a useful electrical signal. The time difference between the transmission of the signal and the receipt of a reflected signal is usually proportional to the physical distance of the transmitting antenna in the propagating medium to the impedance discontinuity or scatterer plus the physical distance to the receiving antenna. The transmitting and receiving antennas are not necessarily the same (monostatic RADAR) or located in the same place (bistatic RADAR).

A ground penetrating RADAR is one whose characteristics are chosen to enable the radiated and reflected electromagnetic energy to penetrate the ground and reflect from impedance discontinuities or scatterers. A ground penetrating RADAR may be used to detect buried objects, some of which may have known dimensions.

A high range resolution RADAR is a RADAR which is able to distinguish multiple impedance discontinuities or scatterers in range on a single target. High range resolution for a RADAR designed to detect aircraft at long ranges might have range resolution on the order of 6 inches; one for ground penetrating RADAR to detect landmines might have a range resolution on the order of $\frac{1}{5}$ inch. A general way to refer to a high range resolution RADAR is that it is able to resolve multiple impedance discontinuities or scatters on a target.

A synthetic aperture RADAR is one which creates the equivalent performance of a large antenna by physically moving the transmitting antenna (SAR) or object to be imaged (ISAR) over time. The multiple transmit/receive signals are processed in such a way that the RADAR appears to have an aperture, i.e., a synthetic aperture, much larger than the physical characteristics of the RADAR at rest. This large synthetic aperture allows for the RADAR to produce much higher angular resolution images which essentially produce an image in the azimuth plane.

SONAR is an abbreviation for sound navigation and ranging. Similar to a RADAR, a SONAR can create high resolution images in range or angle of underwater targets.

Infrared sensors detect electromagnetic energy in the infrared (approximately 0.7 to 1000 micron wavelength for near to far infrared). They are essentially optical devices which can provide high resolution images in azimuth and elevation. Active optical sensors, LIDAR, which additionally transmit electromagnetic energy at optical wavelengths can also provide range information, however once blocked, the energy does not pass around the target to detect signals at further ranges as the RADAR can.

An x-ray device is one which uses ionizing radiation to create an image by passing the electromagnetic energy through a target. It provides high resolution in the horizontal and vertical directions. This imaging capability can provide the same SOIDOS information on a target as RADAR if the target is oriented in the right direction.

Backscatter x-ray devices is a device where not all non-ionizing (e.g., x-ray) radiation passes through a target. Some of the energy is scattered back to the receiver at various angles and can be used to produce an image on the front side (the transmitter side) of the target. These kinds of devices have been used to inspect airline packages.

Targets may include any kind of object that has impedance discontinuities such as a landmine; an improvised explosive device; a flying object; a maritime object; a land object; and an enclosed object. An improvised explosive device is one which is made utilizing non-traditional methods and usually exploits a piece of expended but unexploded ordnance for its destructive force. An improvised explosive device can be almost anything with any type of material and initiator. It is a 'homemade' device that is designed to cause death or injury by using explosives alone or in combination with toxic chemicals, biological toxins, or radiological material. Unexploded ordnance (UXO) is explosive ordnance that has been primed, fuzed, armed or otherwise prepared for use or used. It may have been fired, dropped, launched or projected yet remains unexploded either through malfunction or design or for any other reason." Examples of flying objects are missiles, aircraft, spacecraft, and reentry vehicles. Examples of maritime objects are submarines, surface ships, hovercraft, and boats. Examples of land objects are buildings, tanks, vehicles, structures, towers, and bridges. Examples of enclosed objects are explosives, detonators, triggering devices, and contraband.

The sequence detector may include any means for identifying a data or information sequence such as: a language recognizer; a non-reset finite state machine language recognizer; or a multi-correlation detector. Preferably, the sequence detector compares at least one of the spatial sequence(s) with a predetermined sequence representing at least one physical characteristic of a target such that it is within a predetermined range.

Similar to the mine detector, the target detector may be configured to discriminate between at least one desired target and non-targets.

Embodiments of the present invention may include a target classifying computer program embodied on a tangible computer readable medium, where execution of the computer program by one or more processors causes the processors to perform the steps of: receiving a received signal containing spatial sequence(s) from an imaging device, and associating at least one of the spatial sequence(s) with at least one physical characteristic of a target using relative spatial information contained in the spatial sequence(s). Preferably, the spatial information contains information which locates impedance discontinuities that are indicative of the physical characteristics of imaged targets. The process of associating at least one of the spatial sequence(s) with physical characteristics of a target may be performed using a non-reset finite state machine.

Figure 10:
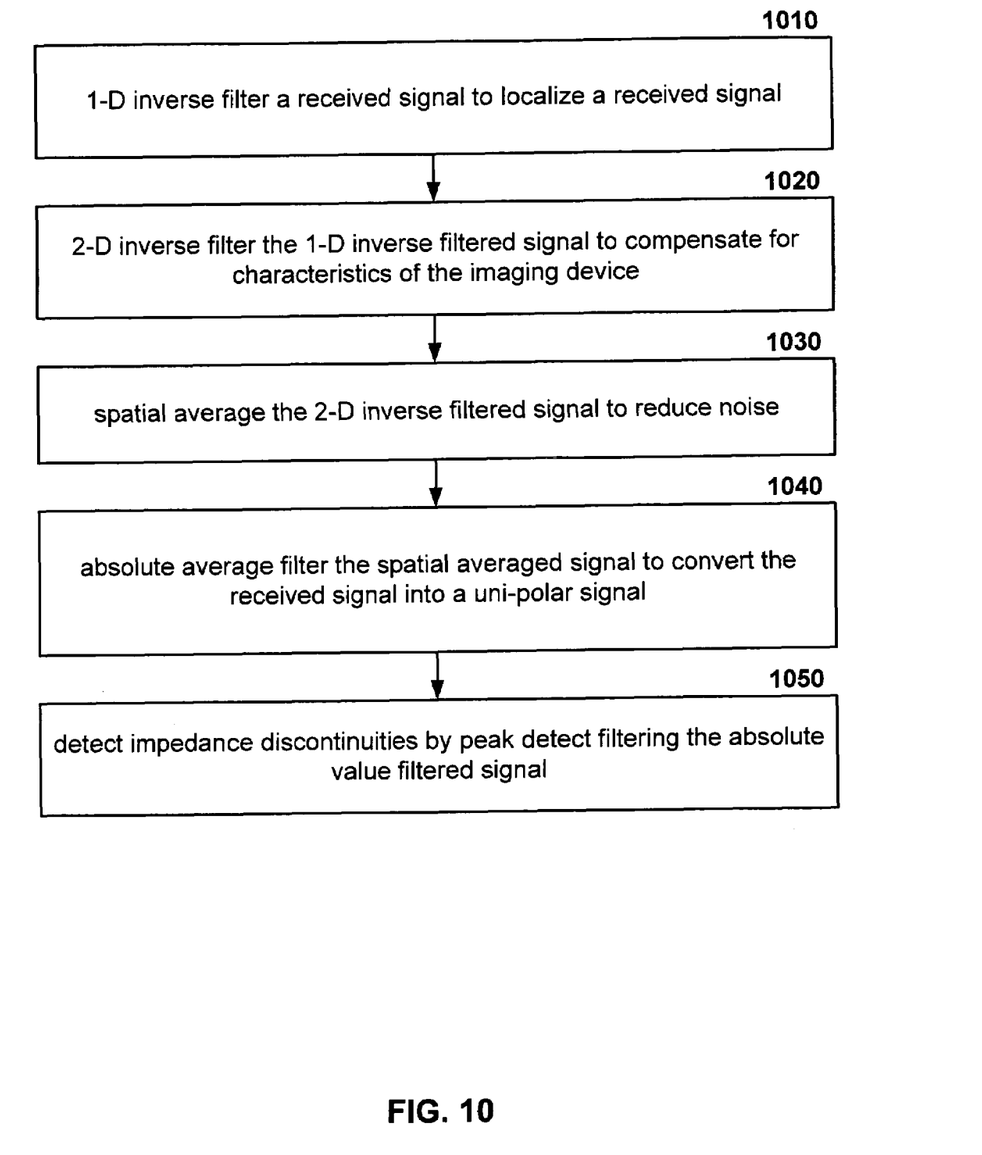
FIG. 10 is a flow diagram of a method using 1-D and 2-D inverse filtering of a receiver signal.

As discussed earlier, the received signal may be further signal processed using filters such as a 1-D inverse filter; a 2-D inverse filter; a 3-D inverse filter; a spatial averaging filter; an absolute value filter; and a peak detection filter. Referring to FIG. 10 we see an embodiment which performs several of these filtering steps. First, a 1-D inverse filtered signal is generated at step 1010 by 1-D inverse filtering a received signal to localize the received signal. Next, at step 1020, a 2-D inverse filtered signal may be generated by 2-D inverse filtering the 1-D inverse filtered signal to compensate for characteristics of the imaging device. A spatial averaged signal may then be generated by spatial averaging the 2-D inverse filtered signal to reduce noise at step 1030. An absolute value filtered signal may then be generated at step 1040 by absolute average filtering the spatial averaged signal to convert the received signal into a uni-polar signal. Finally, impedance discontinuities may be detected by peak detection filtering the absolute value filtered signal at step 1050.

The sequence detector may be implemented using a detection means such as a language recognizer, a non-reset finite state machine language recognizer, or a multi-correlation detector.

A predetermined sequence representing at least one physical characteristic of the "target" within a predetermined range may be compared to spatial sequences originating from the received signal in order to associate a detection with a target. Similarly, one can compare these sequences to discriminate between desired targets and non-targets.

Other possible operations may include comparing the spatial sequences with variants of the predetermined sequences to account for rotational variances of targets. The variants may include foreshortened sequences as well as sequences created while targets are lying at a multiplicity of angles.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. For example, one skilled in the art will recognize the present invention could be implemented to consider additional data regarding characteristics of an imaged target when making a target match determination. Additional characteristics may include measured metallic properties, measured magnetic properties or measured target emissions, measured modulation induced on the signal by target kinematics or mechanical motion of target constituents, or the differential polarities of returned signals. Additionally, one skilled in the art will recognize that further signal processing may be used such as Fourier or other linear transformations or any of a number of nonlinear transformations of a received signal.

Additionally, there are other classes of language recognizers which can be applied to detect a spatial sequence. These language recognizers may be context sensitive and modify their detection process based on the context within which a signal is received. Nothing in this specification is interpreted as limiting the use of language recognizers to regular language recognizers.

What is claimed is:

1. A tangible computer-readable medium encoded with a landmine detection computer program, wherein execution of said "computer program" by one or more processors causes said "one or more processors" to perform the steps of:
   a) receiving a received signal from a ground penetrating RADAR, said "received signal" containing relative spatial information locating impedance discontinuities;
   b) processing said "received signal" to generate at least one spatial sequence characteristic of said "relative spatial information"; and
   c) associating at least one of said "at least one spatial sequence" with a landmine when said "at least one spatial sequence" matches within a predetermined limit of at least one representation of a second spatial sequence, said second spatial sequence indicative of at least one physical characteristic of said "landmine".

2. A tangible computer-readable medium according to claim 1,
   wherein said "received signal" is a time domain signal and said "spatial information" is temporal.

3. A tangible computer-readable medium according to claim 1,
   wherein step 1.c uses a non-reset finite state machine.

4. A tangible computer-readable medium according to claim 1,
   wherein step 1.c uses a language recognizer.

5. A tangible computer-readable medium according to claim 1,
   wherein step 1.c uses a multi-correlation mechanism.

6. A tangible computer-readable medium according to claim 1,
   further including the step of signal processing said "received signal".

7. A tangible computer-readable medium according to claim 1,
   further including the step of signal processing said "received signal" using at least one of the following:
   a) a 1-D inverse filtering step;
   b) a 2-D inverse filtering step;
   c) a 3-D inverse filtering step;
   d) a spatial averaging filtering step;
   e) an absolute value filtering step; and
   f) a peak detection filtering step.

8. A tangible computer-readable medium according to claim 1,
   further including the steps of:
   a) generating a 1-D inverse filtered signal by 1-D inverse filtering said "received signal";
   b) generating a 2-D inverse filtered signal by 2-D inverse filtering said 1-D inverse filtered signal;
   c) generating a spatial averaged signal by spatial averaging said 2-D inverse filtered signal;
   d) generating an absolute value filtered signal by absolute average filtering said spatial averaged signal; and
   e) generating a peak detected signal by peak detection filtering said absolute value filtered signal.

9. A tangible computer-readable medium according to claim 1,
   wherein step 1.c compares at least one of said "at least one spatial sequence" with a predetermined sequence representing at least one physical characteristic of said landmine such that it is within a predetermined range.

10. A tangible computer-readable medium according to claim 1,
    further including the step of discriminating between at least one desired landmine and non-landmines.

11. A landmine detector, comprising:
    a) a receiver, said receiver configured to receive a received signal from a ground penetrating RADAR, said "received signal" containing relative spatial information locating impedance discontinuities; and
    b) a signal processor configured to generate at least one spatial sequence characteristic of said "relative spatial information by signal processing said "received signal"; and
    c) a sequence detector configured to associate at least one of said "at least one spatial sequence" with a landmine when said "at least one spatial sequence" matches within a predetermined limit of at least one representation of a second spatial sequence, said "second spatial sequence" indicative of at least one physical characteristic of said "landmine".

12. A landmine detector according to claim 11, wherein said "received signal" is a time domain signal and said "spatial information" is temporal.

13. A landmine detector according to claim 11, wherein said "sequence detector" is a non-reset finite state machine.

14. A landmine detector according to claim 11, wherein said "sequence detector" is a language recognizer.

15. A landmine detector according to claim 11, wherein said "sequence detector" is a multi-correlation detector.

16. A landmine detector according to claim 11, further including a signal processor configured to process said "received signal".

17. A landmine detector according to claim 16, wherein said "signal processor" includes at least one of the following:
    a) a 1-D inverse filter;
    b) a 2-D inverse filter;
    c) a 3-D inverse filter;
    d) an absolute value filter;
    e) a peak detection filter; and
    f) a spatial averaging filter.

18. A landmine detector according to claim 16, wherein said "signal processor" includes:
    a) a 1-D inverse filter having a 1-D inverse filter input and a 1-D inverse filter output, said 1-D inverse filter input wired to receive said received input;
    b) a 2-D inverse filter having a 2-D inverse filter input and a 2-D inverse filter output, said 2-D inverse filter input connected to said 1-D inverse filter output; configured to generate a third signal by processing said received signal;
    c) an absolute value filter having an absolute value filter input and an absolute value filter output, said absolute value input connected to said 2-D inverse filter output;
    d) a peak detection filter having a peak detection filter input and a peak detection filter output, said peak detection input connected to said absolute value filter output; and
    e) a spatial averaging filter having a spatial averaging filter input and a spatial averaging filter output, said spatial averaging filter input connected to said peak detection filter output.

19. A landmine detector according to claim 11, wherein said "sequence detector" compares at least one of said "at least one spatial sequence" with a predetermined sequence representing at least one physical characteristic of said "landmine" such that it is within a predetermined range.

20. A landmine detector according to claim 11, further including a discriminator configured to discriminate between at least one desired landmine and non-landmines.

* * * * *